United States Patent
Shiratori et al.

[11] Patent Number: 5,082,400
[45] Date of Patent: Jan. 21, 1992

[54] INSERT ROTARY CUTTER

[75] Inventors: Hidehisa Shiratori; Masaaki Nakayama, both of Tokyo, Japan

[73] Assignee: Mitsubishi Materials Corporation, Tokyo, Japan

[21] Appl. No.: 425,032

[22] Filed: Oct. 23, 1989

[30] Foreign Application Priority Data

Oct. 25, 1988 [JP] Japan .................. 63-268547

[51] Int. Cl.⁵ .............................. B26D 1/12
[52] U.S. Cl. ..................... 407/42; 407/40; 407/41; 407/30
[58] Field of Search ............. 407/61, 51, 42, 40, 407/41, 55, 30

[56] References Cited

U.S. PATENT DOCUMENTS

| | | |
|---|---|---|
| 1,460,030 | 6/1923 | Mattson . |
| 2,761,196 | 9/1956 | Graves et al. ............ 407/61 |
| 2,949,946 | 8/1960 | Johnson et al. .......... 407/61 |
| 3,203,072 | 8/1965 | Careje .................... 407/61 |
| 3,818,562 | 6/1974 | Lacey .................... 407/40 |
| 4,449,864 | 5/1984 | Hague et al. ............ 407/42 |
| 4,529,338 | 7/1985 | Rekfritz ................. 407/61 |
| 4,808,044 | 2/1989 | Tsujimura et al. ........ 407/42 |

FOREIGN PATENT DOCUMENTS

| | | |
|---|---|---|
| 0877398 | 9/1952 | Fed. Rep. of Germany ..... 407/42 |
| 1905038 | 8/1970 | Fed. Rep. of Germany . |
| 2168417 | 8/1973 | France . |
| 54-137187 | 10/1979 | Japan . |
| 1394301 | 1/1973 | United Kingdom . |

Primary Examiner—Bruce M. Kisliuk
Assistant Examiner—Lawrence Cruz
Attorney, Agent, or Firm—Cushman, Darby & Cushman

[57] ABSTRACT

A insert rotary cutter has a cutter body, at least one first cutter insert and at least one second cutter insert for cutting off burrs. The first cutter insert has more than one main cutting edge and end cutting edge. The second cutter insert has more than one main cutting edge and end cutting edge. The first and second cutter inserts are mounted on a forward end of the cutter body releasably. The second cutter insert is disposed so that the main cutting edge thereof has a negative corner angle and the end cutting edge thereof is displaced radially inwardly and axially forwardly of the cutter body, with respect to the end cutting edge of the first cutter insert.

6 Claims, 6 Drawing Sheets

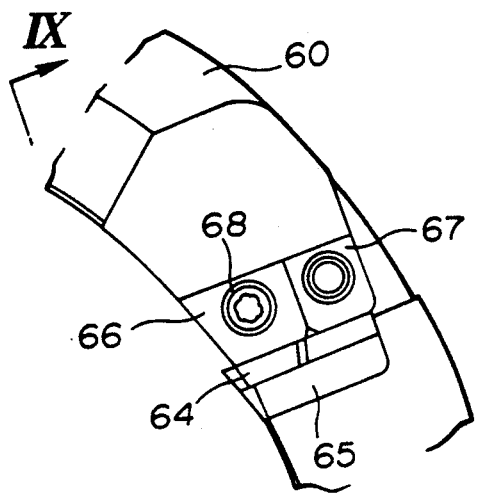
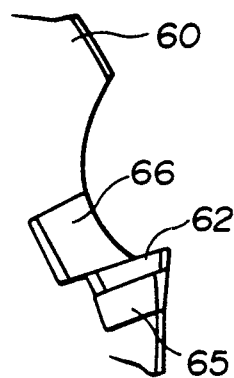
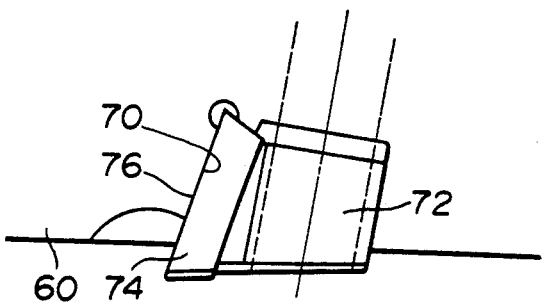
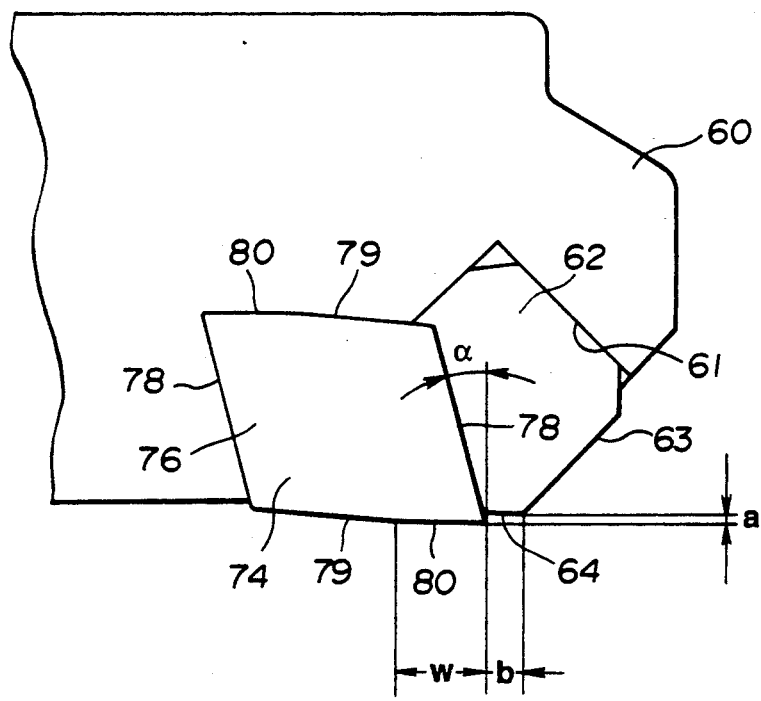

FIG.14 FIG.15 FIG.16 FIG.17
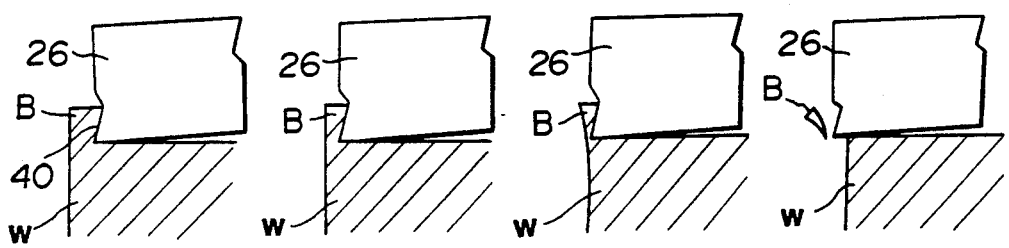
FIG.18 FIG.19 FIG.20 FIG.21
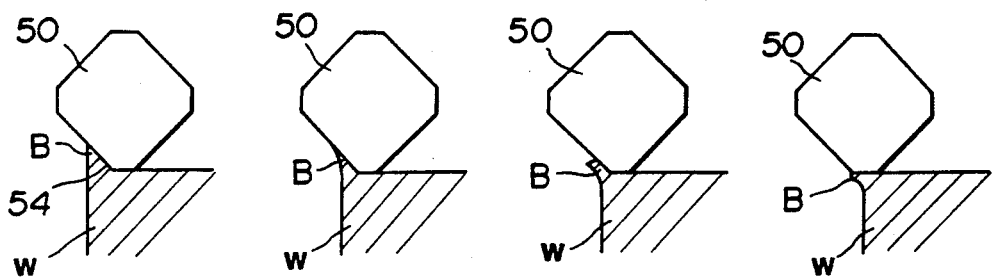

FIG. 22  FIG. 23  FIG. 24  FIG. 25
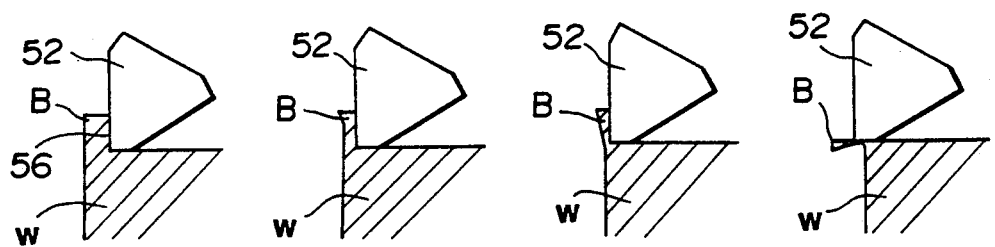
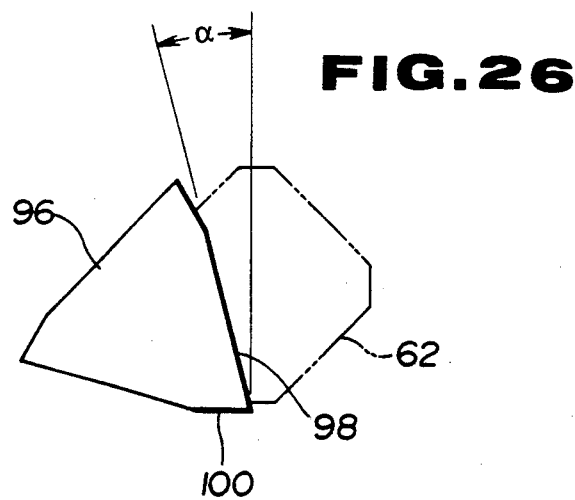
FIG. 26

INSERT ROTARY CUTTER

BACKGROUND OF THE INVENTION

1. Field of the Invention

The present invention pertains to an insert rotary cutter having at least one first cutter insert and a least one second cutter insert for cutting off burrs attached to a cutter body.

2. Prior Art

In processing the surface of a metal workpiece by means of a insert rotary cutter, such as an insert face milling cutter (hereinafter referred to as a face milling cutter) having a plurality of cutter inserts thereon, burrs often remain at the edge of the processed surface of the workpiece. It is thought that the cause of burrs remaining is that the force to bend a small portion of the workpiece adjacent to the edge exceeds the shearing force to cut off the portion, and is that the small portion of the workpiece being bent by the cutting edge of the cutter insert toward the feeding direction of the face milling cutter prior to being cut off thoroughly by the cutting edge. Therefore, to avoid leaving burrs at the edge of the workpiece, the use of cutter inserts is recommended having sharp cutting edges attached on the milling cutter body with a high positive rake angle so as to reduce the force to bend which acts on the workpiece and to enable to cut the burr off thoroughly.

In addition to the above, it is well-known that a honed edge is inferior to an edge without honing to avoid leaving burrs, even if the honed edge has increased strength and prolonged service life. Accordingly, it is not adequate to employ a cutter insert having an honed edge in the processing to avoid leaving burrs.

On the contrary, in an insert rotary cutter having the sharp cutting edge without honing attached thereon with a high positive rake angle, the cutting edge tends to chip easily as its strength deteriorates Therefore, the insert rotary cutter of the kind referred to above, is not available for processing ordinary metal workpieces.

One conventional rotary cutter designed to leave no burrs on the processed surface of a workpiece is shown in Published Unexamined Japanese Patent Application No. 54-137187. This conventional insert rotary cutter has an equal number of first cutting edges and second cutting edges attached to a forward end of a tool body alternately in the circumferential direction; the second cutting edges are disposed radially inwardly and axially forwardly of the tool body with respect to the first cutting edges, thereby any burrs remaining on the surface processed by the first cutting edges will be swept off by the second cutting edge.

In the rotary cutter described above, however, new burrs are formed by the second cutting edge. Therefore, the rotary cutter is not capable of preventing the leaving of burrs on the processed surface of the workpiece.

SUMMARY OF THE INVENTION

It is therefore an object of the present invention to provide a insert rotary cutter capable of preventing burrs from remaining on a processed surface of a workpiece.

According to the present invention, there is provided a insert rotary cutter comprising:

a cutter body having an axis of rotation therethrough and having a forward end portion; and at least one first cutter insert having more than one main cutting edge and more than one end cutting edge; and at least one second cutter insert for cutting off a burr having more than one main cutting edge and more than one end cutting edge releasably mounted at the forward end portion of the cutter body, said second cutter insert being disposed so that the main cutting edge thereof has a negative corner angle and the end cutting edge thereof is displaced radially inwardly and axially forwardly of the cutter body, with respect to the end cutting edge of the first cutter insert.

BRIEF DESCRIPTION OF THE DRAWINGS

FIG. 8 is a view seen in the direction indicated by arrow VIII of FIG. 6;

FIG. 9 is a view seen in the direction indicated by arrow IX of FIG. 8;

FIG. 10 is an enlarged fragmentary cross-sectional view showing the relative position of a standard cutting insert and a burr cutting insert of FIG. 6;

FIG. 11 is a view seen in the direction indicated by arrow XI of FIG. 6;

FIG. 14 to FIG. 17 are schematic cross sectional views showing states in which a workpiece is being cut by a burr cutting insert of FIG. 6;

FIG. 18 to FIG. 21 are views similar to FIG. 14 to FIG. 17, but show states in which a workpiece is being cut by a cutting insert having positive corner angle;

FIG. 22 to FIG. 25 are views similar to FIG. 14 to FIG. 17, but show states in which a workpiece is being cut by a cutting insert a corner angle of 0°; and FIG. 26 is a view similar to FIG. 5, but showing a burr cutting triangular insert with the standard-cutting edge of the second embodiment indicated by alternate-long-and-two-short-dashes line.

DESCRIPTION OF THE PREFERRED EMBODIMENTS OF THE INVENTION

Figure 1:
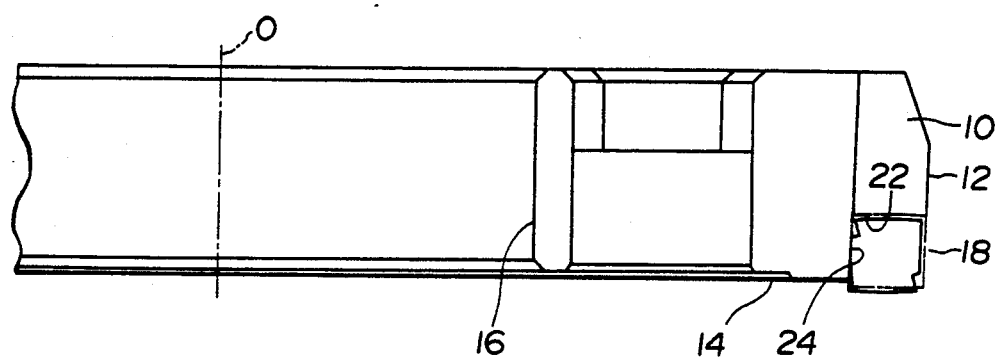
FIG. 1 is a cross-sectional view of a face milling cutter to an embodiment of the invention.
Figure 2:
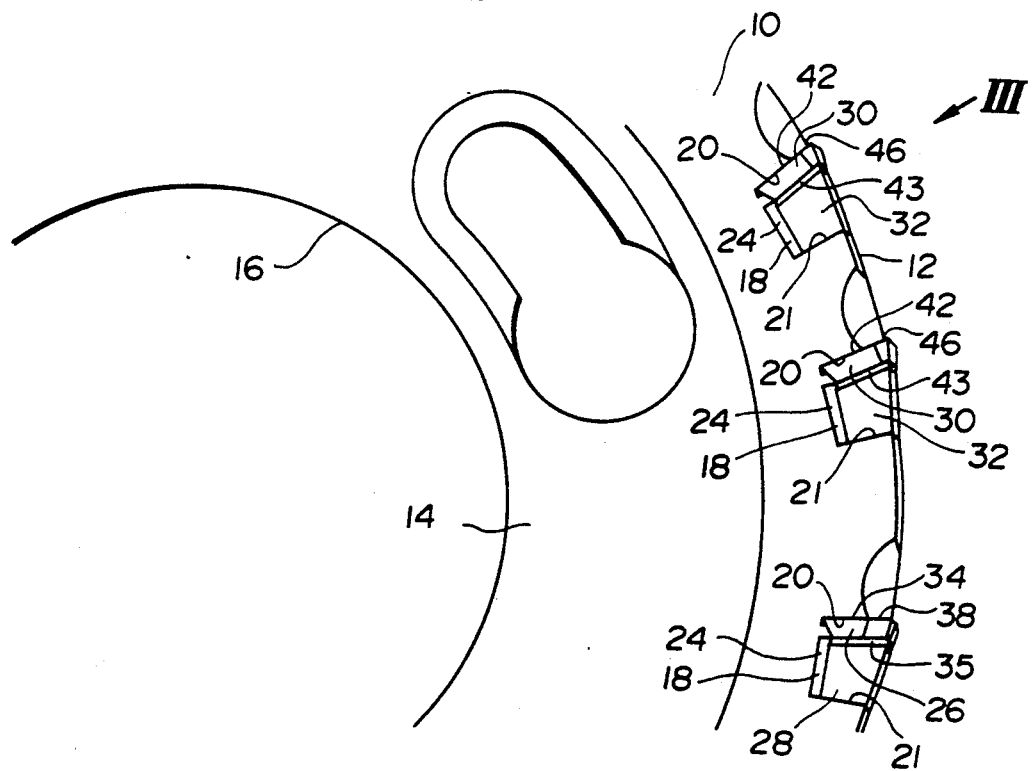
FIG. 2 is a bottom view of the face milling cutter of FIG. 1.
Figure 3:
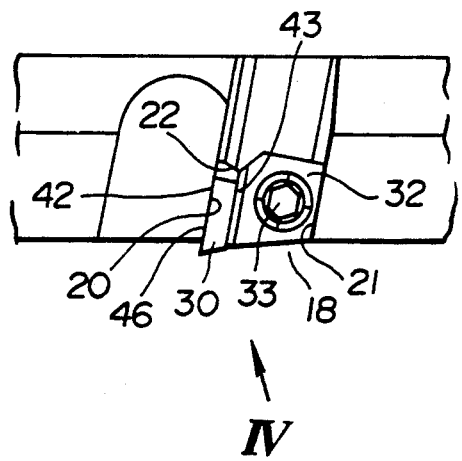
FIG. 3 is a view seen in the direction indicated by arrow III of 2.
Figure 4:
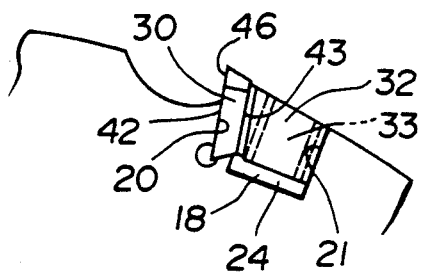
FIG. 4 is a view seen in the direction indicated by arrow IV of 3.

Referring to FIGS. 1 to 5, a face milling cutter according to the present invention comprises a cutter body 10 of a circular cross-section having an axis of rotation 0 therethrough and having a circumferential surface 12 and a forward end face 14 disposed in a plan perpendicular to the axis of rotation 0. The cutter body 10 has a central bore 16 formed axially therethrough.

The cutter body 10 has a plurality of pockets 18 arranged in circumferentially unequally spaced relation to one another and formed on a forward end portion thereof so as to open radially outwardly and forwardly therefrom. Each of the pockets 18 has a generally channel-shaped cross section defined by a pair of circumferentially-facing opposed first and second side walls 20 and 21, rearward wall 22 and bottom wall 24 interconnecting the first and second wall 20 and 21 and the rearward wall 22 at their inner ends. One or a few of the pockets 18 receive burr cutting inserts (second cutter inserts) 26 through clamp wedge 28 and a screw (not shown) and a plurality of the other pockets 18 receive standard cutter inserts (first cutter insert) 30 through clamp wedge 32 and screw 33 interposed therebetween.

The burr cutting insert 26 comprises a generally square plate defined by a pair of parallel front and rear faces 34 and 35 and two pairs of side faces 36 and 37 lying between the front and rear faces 34 and 35, each side face being sloped inwardly of the plate in a direction away from the front face 34. As described by a solid line in FIG. 5, each of the side faces 36 has a first plane portion 36a directed from each diagonal corner toward the clockwise direction and a second plane portion 36b. Preferably, the first plane portion 36a has a length w ranging from 3 mm to 10 mm. The first plane portion 36a is sloped slightly inwardly in the direction away from the second plane portion 36b. A ridge defined by the front face 34 and the first plane portion 36a serves as an end cutting edge 38. A predetermined portion of the other side faces 37 are removed in a V-shape, directed from the corner adjacent to the end cutting edge 38 toward the counterclockwise direction, to provide main cutting edges 40, in such a manner that the main cutting edge 40 is, preferably within a range of from 5° to 30°, tilted inwardly thereof with respect to the line L perpendicular to the end cutting edge 38.

Figure 5:
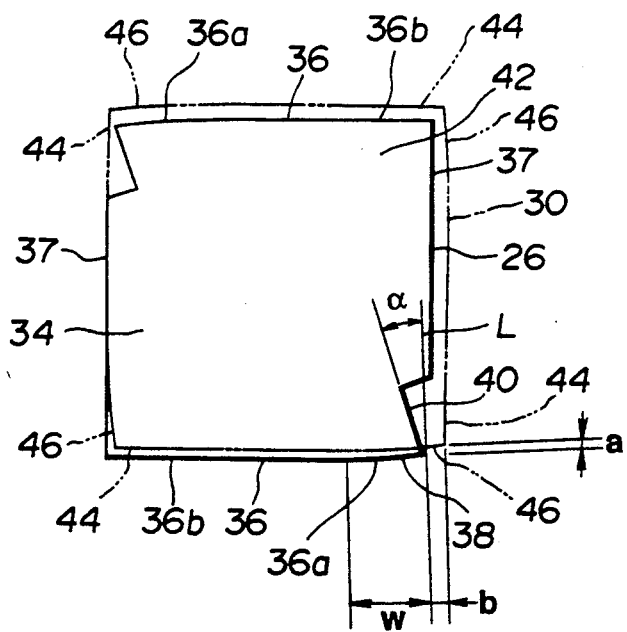
FIG. 5 is a plan view of a burr cutting insert with a standard cutter insert by alternate-long-and-two-short-dashes line, the face milling cutter of FIG. 1.
Figure 6:
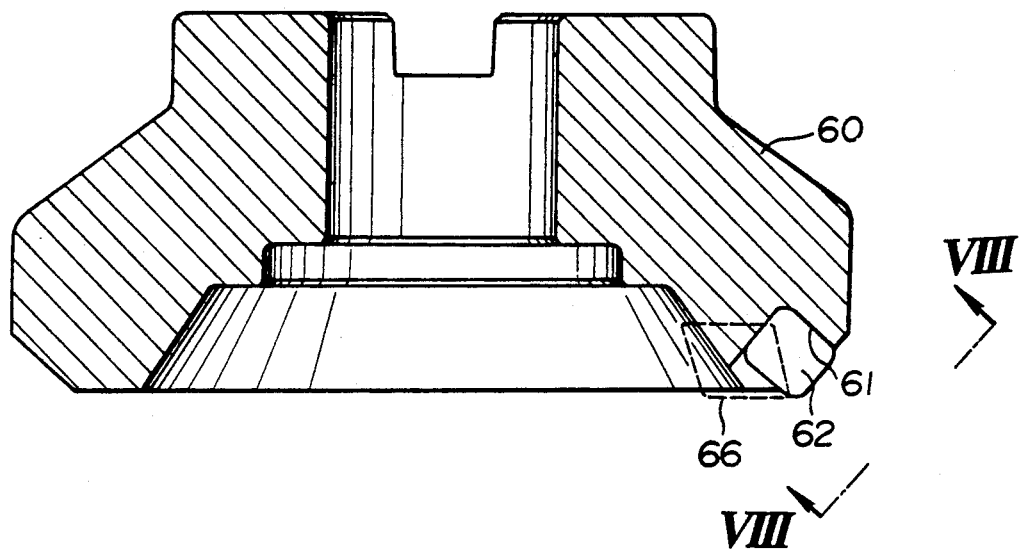
FIG. 6 is a cross-sectional view of a face milling cutter according to a second embodiment of the invention, with a burr cutting insert indicated by alternate-long-and-two-short line.
Figure 7:
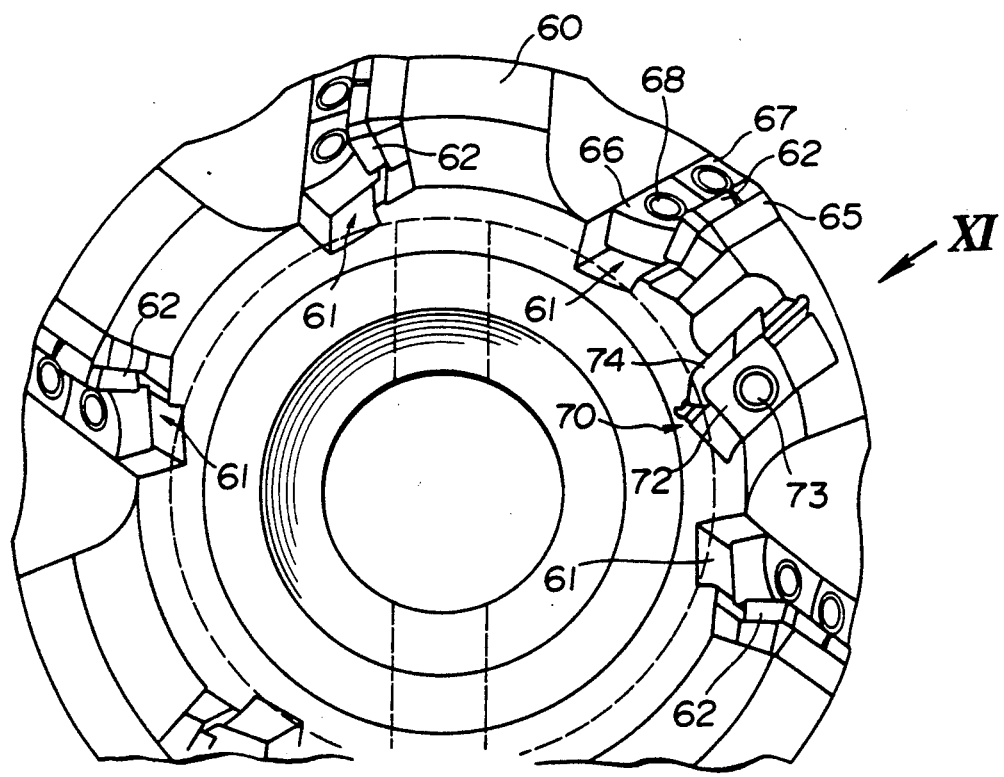
FIG. 7 is a bottom view of the face milling cutter of FIG. 6.

The standard cutter insert 30, as described by the alternate-long-and-two-short-dashes line in FIG. 5, comprises a generally square plate with front face 42 which has four corners and four ridges and with rear face 43. A predetermined portion of each ridge from the corner, directed toward the counterclockwise direction, serves as a main cutting edge 44. Each portion of the ridge from the corner toward the opposite direction of the main cutting edge 44 serve as an end cutting edge 46.

Each burr cutting insert 26 is received in a respective pocket 18 in such a manner that the front face 34 and side face 37 are in contact with the first side wall 20 and bottom wall 24 of the pocket 18 respectively. The burr cutting insert 26 is replaceably held in position by the clamp wedge 28 which is interposed between rear face 35 of the insert 26 and the second side wall 21 of the pocket 18 and secured thereto by a threaded screw. Each standard cutter insert 30 is received in a respective pocket 18 in such a manner that the front face 42 and side face are in contact with the first side wall 20 and bottom wall 24 of the pocket 18 respectively and is replaceably held in position by the clamp wedge 32 which is received between rear face 43 of the insert 30 and the second side wall 21 of the pocket 18 and secured thereto through the screw 33 threaded thereinto.

These burr cutting inserts 26 and standard cutter inserts 30 are so positioned relative to each other that both end cutting edge 38 and end cutting edge 46 are disposed on each plane perpendicular to the axis of rotation O, hence the main cutting edge 40 of the burr cutting insert 26 has negative corner angle $\alpha$ (which is preferably within a range of from $-5°$ to $-30°$), and the end cutting edge 38 is displaced radially inwardly and axially forwardly of the cutter body 10 with respect to the end cutting edge 46 of the standard cutter insert 30 at a distance of b and a respectively as shown in FIG. 5. The distance a is preferably within a range of from 0.05 mm to 0.3 mm.

In the face milling cutter constructed as above since the burr cutting insert 26 and standard cutter insert 30 are so positioned that the main cutting edge 40 of the burr cutting insert 26 has negative corner angle $\alpha$, and the end cutting edge 38 is displaced radially inwardly and axially forwardly of the cutter body 10 with respect to the end cutting edge 46 of the standard cutter insert 30, the force to bend a small portion adjacent to the edge of the workpiece acting for the main cutting edge 40 of the burr cutting insert 26 is less than the required shearing force to cut off the portion by the main cutting edge 40. For this reason, as shown in FIG. 14 to FIG. 17, a small portion B of the workpiece W is completely cut off by the main cutting edge 40 of the burr cutting insert 26, and then it is possible to process the surface of the workpiece W without leaving any burrs.

On the contrary, as shown in FIG. 18 to FIG. 21 or in FIG. 22 to FIG. 25, the conventional face milling cutter having cutting insert 50 or 52 with positive corner angle or corner angle 0°, respectively, is not capable of leaving no burrs. This is because the little portion B of workpiece W adjacent to the edge is not cut off thoroughly but is instead bent by the main cutting edge 54 or 56 toward feeding direction of the milling cutter and remain on the processed surface of the workpiece W as a burr.

In addition, in the embodiment mentioned above, the end cutting edge 38 of the burr cutting insert 26 is capable of serving as a flat cutting edge if the length of the end cutting edge 38 ranges from 3 mm to 10 mm. Accordingly, it is possible to enhance the precision of the processed surface of the workpiece.

FIG. 6 to FIG. 11 show a second embodiment of the rotary cutter in accordance with the present invention. In this face milling cutter, a plurality of pockets 61 are arranged in circumferentially unequally spaced relation to one another and formed on a forward end portion of cutter body 60.

Each pocket 61 receives standard cutter insert (a first cutter insert) 62, having four main cutting edges 63 and four end cutting edges 64 (with corner angles of approximately 45°), through support 65, wedge clamps 66 and 67 and screws 678 interposed therebetween. An additional pocket 70 is formed inward of the pocket 62 disposed between a pair of pockets 62 having the widest distance therebetween. A burr cutting insert (a second cutter insert) 74 is received in the pocket 70 through wedge clamp 72 nd screw 73 interposed therebetween.

As shown in FIG. 10 and FIG. 11, the burr cutting insert 74 comprises a generally parallelogrammatic plate defined by a front face 76 having two pairs of ridges 78 and 79, a rear faces and four side faces lying therebetween. A pair of the ridges 78 serve as main cutting edges and a predetermined portion of the other ridges 79, preferably having a length w ranging from 3 mm to 10 mm, from each acute angled corner serve as end cutting edges 80.

As shown in FIG. 10, these for cutting insert 74 and standard cutter inserts 62 are so positioned to each other that both end cutting edge 80 and end cutting edge 64 are disposed on each plane perpendicular to the axis of rotation, hence the main cutting edge 78 of the burr cutting insert 74 has a negative corner angle α (which is preferably within a range of from −5° to −30°), and the end cutting edge 80 is displaced radially inwardly and axially forwardly of the cutter body 60 with respect to the end cutting edge 64 of the standard cutter insert 62 at a distance of b and a respectively. The distance a is preferably within a range of from 0.05 mm to 0.3 mm.

Figure 12:
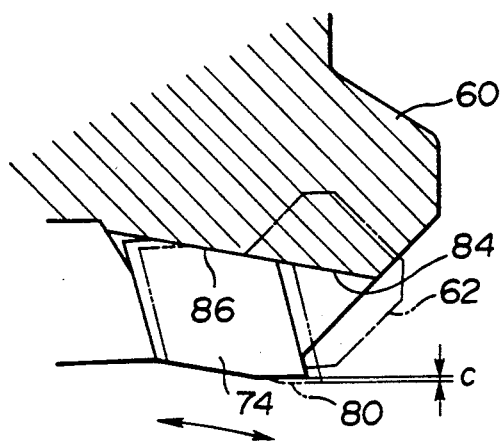
FIG. 12 is a view similar to FIG. 10, but showing a modified pocket of the cutter body.

FIG. 12 shows a third embodiment of the insert rotary cutter in accordance with the present invention, in which the cutter body 70 includes a pocket 84 opened forwardly and radially both inwardly and outwardly therefrom. The burr cutting insert (a second cutter insert) 74 is received in the pocket 84 in such a manner that a side face is in contact with a sloped rear wall 86 of the pocket 84 and hence, a position of the end cutting edge 80 is adjustable within a distance c by sliding itself along the rear wall 86 of the pocket 84.

Figure 13:
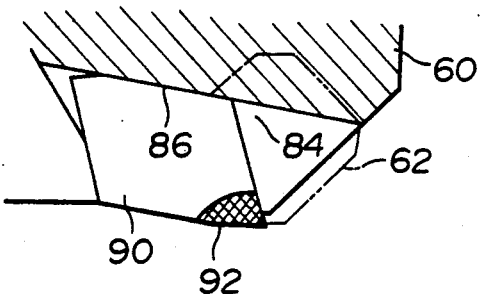
FIG. 13 is a view similar to FIG. 10, but showing a modified burr cutting insert mounted in the cutter body.

FIG. 13 shows a forth embodiment of the inset rotary cutter in accordance with the present invention, in which a burr cutting insert ( a second cutter insert) 90 having the a portion 92 adjacent to an acute angled corner being made of a sintered super-hardened compact is received in the above-mentioned pocket 84.

While the invention has been particularly shown and described with reference to preferred embodiments thereof, it will be understood that various modifications, for example burr cutting triangular insert 96, having main cutting edges 98 and end cutting edges 100, as shown in FIG. 26, being employed instead of the above-mentioned burr cutting insert 26 or 74 in the same manner, may be made therein without departing from the spirit and scope of the invention.

What is claimed is:

1. An insert rotary cutter comprising:
   a cutter body having an axis of rotation therethrough and having a forward end portion; and
   at least one first cutter insert having a main cutting edge and an end cutting edge and at least one second cutter insert for cutting off burrs having a main cutting edge and an end cutting edge releasably mounted at said forward end portion of said cutter body, each said second cutter insert being disposed so that said main cutting edge forms an angle of less than 90° with said end cutting edge so as to have a negative corner angle and said end cutting edge thereof is displaced radially inwardly and axially forwardly of said cutter body, with respect to said end cutting edge of said first cutter insert.

2. An insert rotary cutter according to claim 1, wherein said end cutting edge of said second cutter insert is displaced axially forwardly of said cutter body with respect to said end cutting edge of said first cutter insert within a range of from 0.05 mm to 0.3 mm.

3. An insert rotary cutter according to claim 1, wherein said end cutting edge of said second cutter insert has a length ranging from 3 mm to 10 mm.

4. An inset rotary cutter according to claim 1, wherein said second cutter insert comprises a generally square plate having a front face and a rear face parallel to said front face, two pairs of side faces lying between said front face and rear face, ridges defined by said front face and said side faces, and four corners located between said side faces; and
   at least one of said side faces having a first portion adjacent to a first of said corners defined in a first plane, and a second portion defined in a second plane, said first plane being inclined slightly axially rearwardly from said second plane in a direction toward said first corner, the ridge defined by said front face and said first portion serving as said end cutting edges, and
   another side face next to said one side face and defining therewith said first corner having a third portion defined in a third plane tilted radially inwardly in a direction away from said first corner, the ridge defined by said front face and said third portion defining said main cutting edge.

5. An insert rotary cutter according to claim 1, wherein the cutter body has a plurality of pockets arranged in circumferentially unequally spaced relation to one another and formed on said forward end portion thereof so as to open radially outwardly and forwardly therefrom, one of said pocket recieving said second cutter insert and the other pockets receiving said firs cutter inserts.

6. An insert rotary cutter according to claim 1, wherein the cutter body has a plurality of pockets, receiving said first cutter insert, arranged in circumferentially unequally spaced relation to one another and an additional pocket, receiving said second cutter insert, disposed between a pair of said pockets having the widest distance therebetween.

* * * * *